United States Patent [19]

Ishijima

[11] Patent Number: 5,103,535
[45] Date of Patent: Apr. 14, 1992

[54] CLAMPING BAND

[75] Inventor: Minoru Ishijima, Maebashi, Japan

[73] Assignee: Nippon Seiko Kabushiki Kaisha, Tokyo, Japan

[21] Appl. No.: 674,937

[22] Filed: Mar. 26, 1991

[30] Foreign Application Priority Data

Apr. 6, 1990 [JP] Japan .................. 2-36596[U]

[51] Int. Cl.⁵ ........................................... B65D 63/02
[52] U.S. Cl. ............................. 24/20 R; 24/20 EE; 24/20 CW
[58] Field of Search ............ 24/20 R, 20 CW, 20 EE, 24/20 S, 23 EE

[56] References Cited

U.S. PATENT DOCUMENTS

| | | | |
|---|---|---|---|
| 1,330,737 | 2/1920 | Coffman | 24/20 EE |
| 4,299,012 | 11/1981 | Oetiker | 24/20 W |
| 4,492,004 | 1/1985 | Oetiker | 24/20 EE |
| 4,711,001 | 12/1987 | Oetiker | 24/20 CW |
| 4,724,583 | 2/1988 | Ojima | 24/20 CW |
| 4,742,600 | 5/1988 | Calmettes et al. | 24/20 EE |
| 4,802,261 | 2/1989 | Mizukoshi et al. | 24/20 R |
| 4,901,404 | 2/1990 | Mizukoshi et al. | 24/20 TT |

FOREIGN PATENT DOCUMENTS 259207 10/1988 Japan .
0932116 7/1963 United Kingdom ............ 24/20 EE

*Primary Examiner*—Victor N. Sakran
*Attorney, Agent, or Firm*—Shapiro and Shapiro

[57] ABSTRACT

A clamp band has an inner end and an outer end. A first tool engaging portion to be engaged with one of paired clamping force application portions of a clamping tool, a first clamp portion and a projection adjacent to the first clamp portion are formed in sequence as viewed from a tip edge of the inner end. A second clamp portion to be engaged with the first clamp portion is formed near a tip edge of the outer end, and a second tool engaging portion to be engaged with the other clamping force application portion of the clamping tool is formed on the outer end at a position further from the tip edge. A distance between the first clamp portion and the projection and a distance between the second clamp portion and the tip edge of the second end are selected such that the tip edge of the second end is juxtaposed to an end edge of the projection when the first clamp portion is engaged with the second clamp portion.

12 Claims, 1 Drawing Sheet

1

CLAMPING BAND

BACKGROUND OF THE INVENTION

1. Field of the Invention

The present invention relates to an improvement in a clamping band to be used to clamp and fix a cylindrical member such as a boot made of an elastic material, to a fixture having a circumferential surface.

2. Related Background Art

A clamping band made of band steel has been used to clamp and fix a cylindrical boot or cover to a fixture having a substantially circumferential surface such as a transmission shaft of a vehicle. Various clamping bands have been known conventionally. One example is disclosed in Japanese Patent Appln. Laid-Open No. 63-259207 assigned to the assignee of the present invention.

In such clamping bands, the band is first curved in a loop shape, the opposite ends are over-lapped radially, and then a clamping tool is engaged with tool engagements (holes or projections) at the ends of the band to apply a clamping force tangentially to the ends to reduce a radius of the band, and finally an engaging portion of the inner end and an engaging portion of the outer end are engaged.

An engaging pawl formed on the second end, which is radially outer end when the opposite ends are overlapped, is critical. If the engaging pawl is formed at a portion spaced or retracted away from the tip of the second end, the second end may be separated from the outer periphery of the first end and drift radially outerwardly after the clamping.

In Japanese Patent Appln. Laid-Open No. 63-259207 mentioned above, a retaining member is provided at the first end to prevent the drifting outward of the second end. The retaining member comprises a fixed member fixed to the inside of the first end and a pair of arms extending outward therefrom to engage with the second end.

However, since the fixed member of the retaining member extends beyond the radially inner side of the first end, a projection is formed by the fixed member on the inner peripheral surface of the band to prevent the close contact of the clamping band to the boot. This results in the closure of the boot being deteriorated.

Further, since the tip edge of the second end is exposed along the outer peripheral surface of the first end, a step having the thickness of the second end is formed. Thus, surrounding parts may interfere with the step (tip edge) so that the band might be taken off from the boot.

SUMMARY OF THE INVENTION

It is a first object of the present invention to provide a clamping band which can prevent the drifting outward of the second or outer end without forming a retaining member on the inner side of the inner end.

It is a second object of the present invention to provide a clamping band which can prevent the bending of the outer end which might be caused by an external force.

In accordance with the present invention, the drifting outward of the second end is prevented without providing a retaining member separately from the clamping band and hence without forming a projection on the inner peripheral surface of the inner end.

Further, since no step is formed between the tip of the second end and the outer peripheral surface of the first end, surrounding parts do not interfere with the tip edge of the second end.

DETAILED DESCRIPTION OF THE PREFERRED EMBODIMENT

An embodiment of the present invention is now explained with reference to the drawings.

Figure 1:
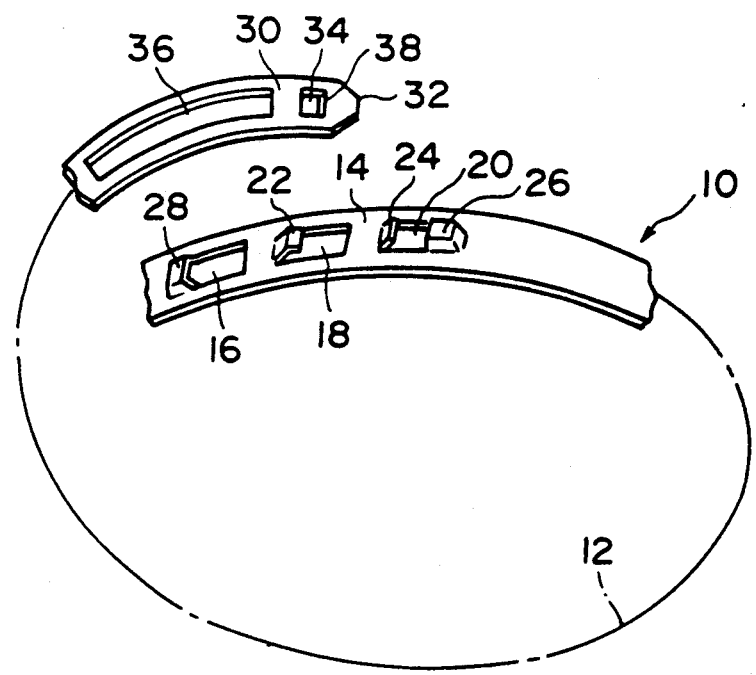
FIG. 1 shows a perspective view of a clamping band according to the present invention, (with a middle portion thereof omitted)
Figure 2:
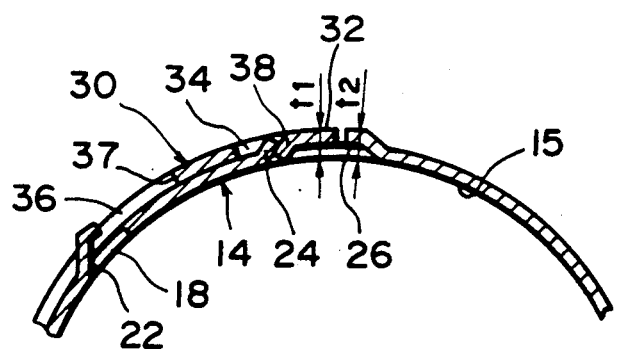
FIG. 2 shows a sectional view illustrating a clamped state.
Figure 3:
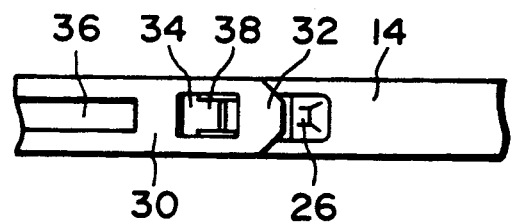
FIG. 3 shows a plan view of the same.

As shown in FIGS. 1 to 3, a clamping band 10 comprises a main body 12 made of a steel having a predetermined width. At a first (inner) end 14, which is the radially inner end when the band is looped with the ends thereof overlapped, apertures 16, 18 and 20 are formed in sequence as viewed from the tip edge. A tunnel-like projection 28 is formed on the side of the first aperture 16 facing the tip edge (left side in FIG. 1), a temporary clamping pawl (third engaging portion) 22 which extends radially outwardly is formed on the side of the second aperture 18 facing the tip edge, a primary clamping pawl (first engaging portion) 24 which extends radially outwardly is formed on the side of the third aperture 20 facing the tip edge and a tunnel-like projection 26 is formed on the opposite side.

A second (outer) end 30, which is the radially outer end when the ends of the band are overlapped, has a pedestal shaped area 32 at the tip thereof, and a rectangular aperture 34 and a slot 36 of elongated rectangular shape are formed in sequence as viewed from the tip edge temporary and primary clamping pawl (second engaging portion) 38 which extends radially inwardly is formed on the side of the rectangular aperture 34 facing the tip edge (right side in FIG. 1). The slot 36 is long enough to permit the fitting of the clamping pawl 22 and the projection 28.

As seen from FIG. 2, the heights (projections) of the clamping pawl 24 and the third clamping pawl 38 are selected substantially equal (about equal to the thickness of the middle portion 12), and the height the $t_1$ of the pedestal area 32 of the second end 30 as measured from the inner periphery 15 of the first end 14 and the height $t_2$ of the tunnel-like projection 26 are substantially equal (and approximately as twice large as the thickness of the middle portion 12). The height $t_2$ may be slightly larger than the height $t_1$.

A process to clamp and fix a boot to a transmission shaft by the clamping band described above is now explained.

The clamping band 10 is looped, the transmission shaft and the boot (both not shown) are surrounded by the middle portion 12 of the clamping band 10, the second end 30 is overlapped on the outer side of the first end 14, and the clamping pawl 22 of the inner end 14 and the clamping pawl 38 of the outer end 30 are engaged. This is called "temporary clamping". The projection 28 of the inner end 14 fits into the slot 36 of the outer end 30.

Then, a pair of clamping force application members of an expansion type clamping tool (not shown) are engaged with the edge 37 (FIG. 2) of the slot 36 and the projection 28, and an expansion force in a tangential direction is applied to the clamping force application members to drive the inner end 14 and the outer end 30 to the directions which increase the overlapped area (in FIG. 2, leftward for the inner end 14 and rightward for the outer end 30). The clamping pawl 38 of the outer end 30 is caused to ride over the clamping pawl 24 of the inner end 14 and is engaged therewith. This is called "final clamping" and is shown in FIG. 2. Under this state, the clamping pawl 22 and the projection 28 of the inner end 14 fit into the slot 36 of the outer end 30.

The clamping pawl 38 of the outer end 30 is formed in the vicinity of the the edge and an area ahead thereof (toward the tip edge) is very short. Accordingly, there is no risk that the area ahead of the clamping pawl 38 of the outer end 30 might drift outward from the inner end 14. Thus, the retaining member described earlier need not be provided at the inner end 14, and the inner peripheral surface of the body 12 is made flat so that the closure of the clamped body is enhanced.

As seen from FIG. 2, which shows the final clamping state, the pedestal area 32 at the tip of the outer end 30 and the projection 26 of the inner end 14 are positioned at substantially the same height ($t_2$) as measured from the inner peripheral surface 15 of the inner end 14, and there is no step formed therebetween. Accordingly, there is almost no risk that surrounding parts will interfere with the pedestal area 32, because the interval between the clamping pawl 24 and the projection 26 is also selected giving due regard to the distance of the tip edge of pedestal area 32 from the edge of the aperture 34. Since the projection 26 smoothly projects and no corner is formed, there is no risk that it will e broken even if it interferes with the surrounding parts.

The above is but one embodiment of the present invention and the present invention is not limited thereto. What is intended by the present invention is to avoid exposure of the tip edge of the outer end along the outer peripheral surface of the inner end, and it is not essential to the present invention that the tip of the outer end is of pedestal shape.

What is claimed is:

1. A clamping band adapted to be clamped and fixed about a cylindrical object by surrounding the object with opposite end portions of the band overlapping each other, and by applying a clamping force to said end portions with a clamping tool, characterized in that;
   a first said end portion, which is the radially inner end portion when said end portions of the band are overlapped, has, in succession as viewed from a tip thereof, a first clamp portion (24), a hole (20) formed adjacent to said first clamp portion, and a radially outwardly protruding tunnel-like projection (26) adjacent to said hole with an end edge defining an opening toward said hole;
   a second said end portion which is the radially outer end portion when said end portions of the band are overlapped, has a second clamp portion (38) formed near a tip edge of said second end portion for engagement with said first clamp portion;
   a first tool engaging portion (28) and a second tool engaging portion (37) are respectively provided on said first end portion and said second end portion; and
   a distance between said first clamp portion and said projection of said first end portion and a distance between said second clamp portion and the tip edge of said second end portion are such that the tip edge of said second end portion is circumferentially juxtaposed to said end edge of said projection when said first clamp portion is engaged with said second clamp portion.

2. A clamping band according to claim 1, wherein said first clamp portion, hole, and projection of said first end portion are formed in contiguous succession.

3. A clamping band according to claim 1, wherein opposite circumferential edges of said second end portion are convergent near said tip edge of said second end portion.

4. A clamping band according to claim 1, wherein said projection protrudes by an amount at least substantially equal to a thickness of said tip edge of said second end portion.

5. A clamping band according to claim 1, wherein said first end portion has an additional clamp portion between said first tool engaging portion and said first clamp portion, and wherein said second clamp portion engages said third clamp portion in a temporary clamping state of the band, and said first clamp portion engages said second clamp portion in a final clamping state of the band.

6. A clamping band according to claim 1, wherein an end of said projection opposite to said end edge is closed and projects smoothly outwardly.

7. A clamping band adapted to be clamped and fixed about a cylindrical object by surrounding the object with opposite end portions of the band overlapping each other, and by applying a clamping force to said end portions with a clamping tool, characterized in that:
   a first said end portion, which is the radially inner end portion when said end portions of the band are overlapped, has, in succession as viewed from a tip thereof, a first tool engaging portion (28) for engagement with one of a pair of clamping force applying members of the clamping tool, a radially outwardly protruding first clamp portion (24), a hole (20) formed adjacent to said first clamp portion, and a radially outwardly protruding tunnel-like projection (26) adjacent to said hole with an end edge defining an opening toward said hole;
   a second said end portion, which is the radially outer end portion when said end portions of the band are overlapped, has a second clamp portion (38) formed near a tip edge of said second end portion for engagement with said first clamp portion, and an elongate hole (36) formed further than said second clamp portion from said tip edge for receiving said first tool engaging portion, a circumferential end (37) of said elongate hole disposed toward said second clamp portion constituting a second tool engaging portion for engagement with other of the clamping force applying members of the clamping tool; and
   a distance between said first clamp portion and said projection of said first end portion and a distance between said second clamp portion and the tip edge of said second end portion are such that the tip edge of said second end portion is circumferentially juxtaposed to said end edge of said projection when said first clamp portion is engaged with said second clamp portion.

8. A clamping band according to claim 7, wherein said first clamp portion, hole, and projection of said first end portion are formed in contiguous succession.

9. A clamping band according to claim 7, wherein opposite circumferential edges of said second end portion are convergent near said tip edge of said second end portion.

10. A clamping band according to claim 7, wherein said projection protrudes by an amount at least substantially equal to a thickness of said tip edge of said second end portion.

11. A clamping band according to claim 7, wherein said first end portion has an additional clamp portion between said first tool engaging portion and said first clamp portion, and wherein said second clamp portion engages said third clamp portion in a temporary clamping state of the band, and said first clamp portion engages said second clamp portion in a final clamping state of the band.

12. A clamping band according to claim 7, wherein an end of said projection opposite to said end edge is closed and projects smoothly outwardly.

* * * * *